INVENTORS
WILLIAM N. ROSTA
RUSSELLE L. MAXWELL

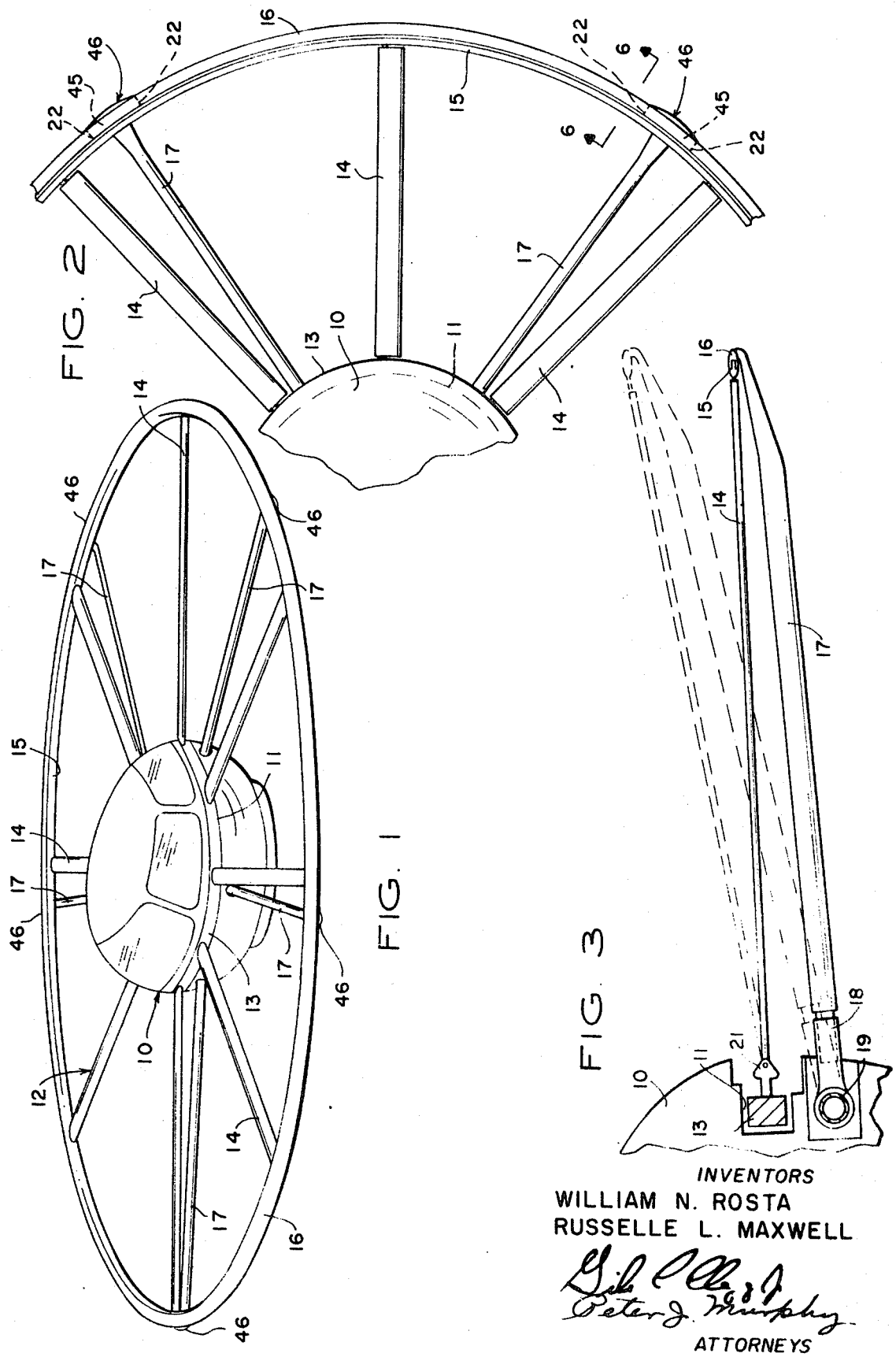

ATTORNEYS

United States Patent Office 3,606,209
Patented Sept. 20, 1971

3,606,209
TURBINE DRIVE FOR ROTARY WING AIRCRAFT
William N. Rosta and Russelle L. Maxwell, Fort Worth, Tex., assignors to The VLM Corporation, Fort Worth, Tex.
Filed Jan. 26, 1970, Ser. No. 5,464
Int. Cl. B64c 27/20
U.S. Cl. 244—12                              19 Claims

ABSTRACT OF THE DISCLOSURE

A rotary wing, vertical lift aircraft includes a central fuselage and a rotor consisting of an inner annular hub rotatably supported on and encircling the fuselage, radially extending rotor blades and an outer ring connecting the outer ends of the blades. The rotor ring is guided in an annular guide track supported on the body by means of radial struts. The rotor ring defines a reaction turbine supplied with pressurized air from air supply stations located in the guide track and supplied from a compressor within the fuselage through the supporting struts.

BACKGROUND OF THE INVENTION

This invention relates to a vertical lift aircraft having a generally horizontally disposed rotor which provides the lift and forward propulsion for the aircraft; and more particularly to an aircraft of this type having a turbine drive arrangement acting on the outer periphery of the rotor.

It is known to provide vertical lift aircraft of the type contemplated by the present invention with turbine type drive means acting on the outer periphery of the rotor assembly for driving the rotor. In some turbine drive arrangements, the outer ring of the rotor is provided with circumferentially spaced turbine blades; and the nonrotatable guide track for the rotor ring is provided with means defining turbine nozzles for directing pressurized air, or other gas, to impinge against the turbine blades of the rotor and provide the motive power for the rotor. A disadvantage of such impulse turbine type drives is that when the turbine nozzles are angled for best efficiency, i.e. approaching a direction tangential relative to the rotor ring, a reaction torque is created which tends to rotate the track and fuselage in a direction opposite to the direction of rotor rotation; and power dissipating means are then required to stabilize the aircraft fuselage with respect to a vertical axis.

An object of this invention is to provide an improved turbine type drive for a rotary wing aircraft.

Another object of this invention is to provide an improved reaction turbine type drive for a rotary wing aircraft.

Still another object of this invention is to provide an improved turbine type drive for a rotary wing aircraft which minimizes reaction torque imparted to the aircraft fuselage.

A further object of this invention is to provide a reaction turbine type drive for a rotary wing aircraft, which is well balanced to obviate structural stresses. A still further object of this invention is to provide an improved turbine type drive for a rotary wing aircraft having an improved air bearing system effective under power and upon power loss.

These objects are accomplished in the rotary wing aircraft having a rotor which includes radially extending rotor blades and an annular ring connecting the outer ends of the blades, and the aircraft fuselage which provides an annular guide track for the rotor ring. The rotor ring includes circumferentially spaced converging nozzle passages, the larger ends of the passages being disposed to receive gas flowing radially from gas supply stations in the guide track, and the smaller discharge ends directing high velocity air in a direction generally tangential relative to the rotor ring.

DRAWINGS

The novel features of the invention, as well as additional objects and advantages thereof, will be understood more fully from the following description when read in connection with the accompanying drawings, in which:

FIG. 1 is a perspective view of an aircraft embodying the present invention;

FIG. 2 is a fragmentary plan view illustrating the fuselage and rotor arrangement;

FIG. 3 is a diagrammatic view in a radial plane illustrating the rotor structure and supporting structure for the rotor;

Figure 4:
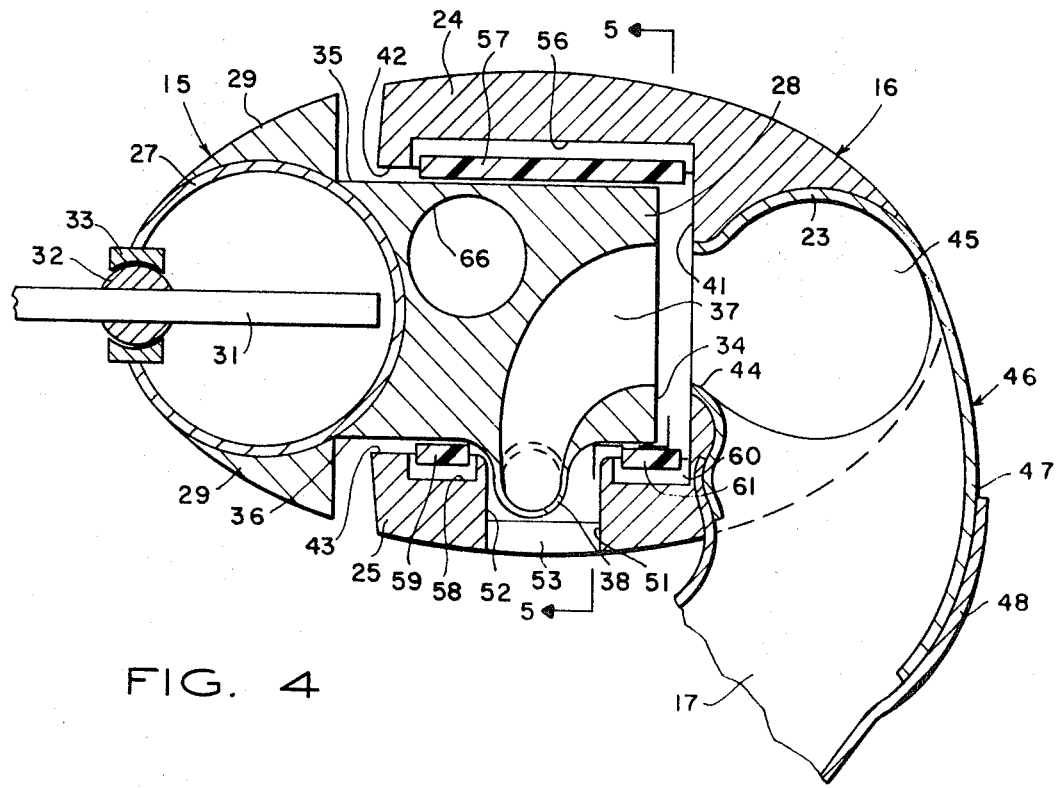
FIG. 4 is a radial sectional view in the plane of a rotor blade and of a strut, of the rotor guide track and the rotor outer ring.
Figure 5:
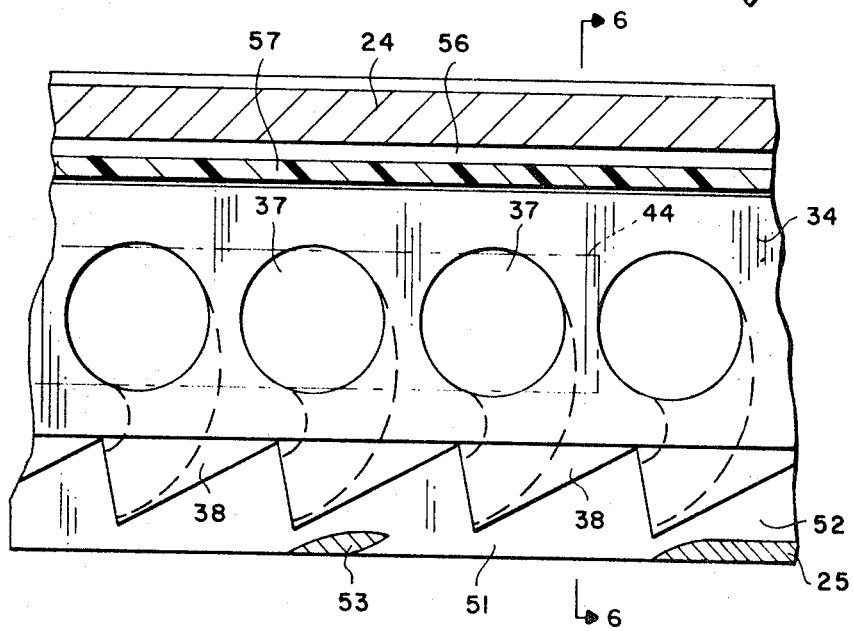
Figure 6:
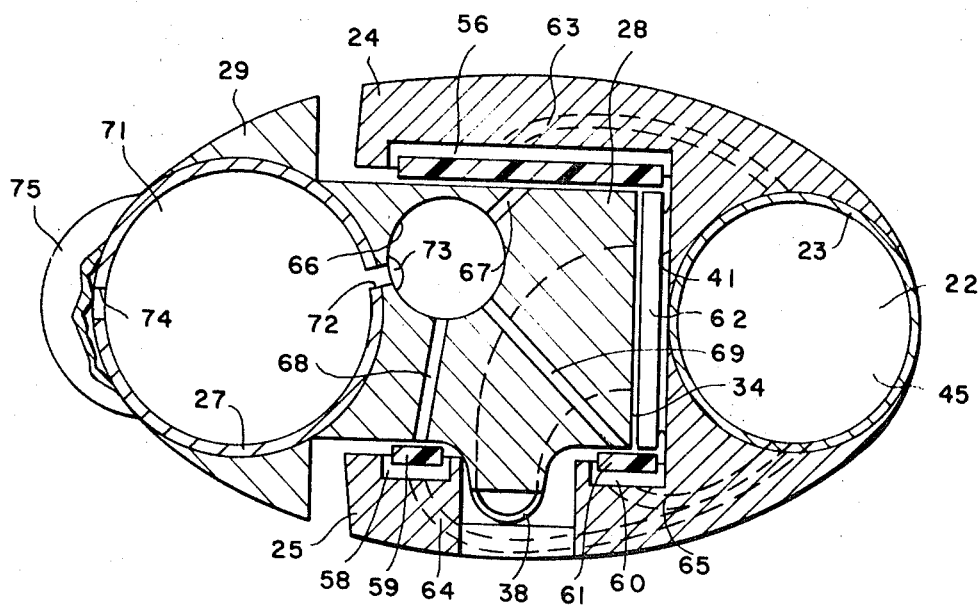

FIG. 5 is a sectional view of a rotor guide track and outer ring as viewed along the line 5—5 of FIG. 4; and FIG. 6 is a radial sectional view of the rotor guide track and outer ring, as viewed along the line 6—6 of FIGS. 2 and 5, illustrating the backup air supply for the air bearings and the seals at the end of the air supply stations.

DESCRIPTION OF THE PREFERRED EMBODIMENT

FIGS. 1, 2 and 3 of the drawing illustrate the general structural features of a rotary wing aircraft with which the present invention may be used. The aircraft includes a fuselage or body 10 which is generally spherical in shape and which is provided with a generally horizontally disposed channel or track 11 about the outer periphery for rotatably supporting the rotor assembly 12. The rotor assembly includes an annular ring or hub 13 which is supported and confined within the body track, eight radially extending and equally spaced rotor blades 14 which define airfoils in the manner of a helicopter, and an outer support ring 15 to which the outer ends of the rotor blades are attached. Suitable bearing means (not shown) are provided between the fuselage track 11 and the rotor hub.

A rotor outer ring 15 is guided in a track defined by a nonrotatable outer ring 16 supported relative to the body 11 by four radial struts 17. Suitable bearing means are provided between the rotor outer ring 15 and the outer guide track 16, as will be described.

As suggested by the fuselage windows shown in FIG. 1, the upper portion of the spherical fuselage may enclose the cabin for the passengers and crew, while the lower portion may enclose compartments for the power and other equipment of the aircraft and for storage.

It is preferable, in an aircraft of this type, that the rotor blades be permitted to "cone"; that is, that the blades be permitted to swing in vertical planes relative to their connection to the hub. With the described structure as will be seen, the rotor ring 15 is axially confined within the guide track 16 so that these parts must move together to permit the coning of the rotor blades; and, accordingly, both the rotor blades 14 and the struts 17 must be pivotally connected at either end to permit this coning. Since the rotor outer ring 15 and the guide track 16 are of fixed diameter, means must be provided to permit elongation of both the rotor blades and the strut structures during coning. The coning function and structure are illustrated diagrammatically in FIG. 3, which is a diagrammatic elevation view of a rotor blade and strut. As shown in FIG. 3, the strut 17 is a telescoping member having an inner end portion 18 defining a bearing which is rotatably mounted on a journal member 19 to permit vertical swinging movement of the strut. The guide track 16 is supported at the outer end of the strut 17 by means of a pivotal arrangement which will be described subsequently. As indicated in FIG. 3, the rotor hub 13 may be generally rectangular in cross section, supported in a generally rectangular inner track 11 by means of suitable air bearings. The rotor blade 14 may be connected to the hub 13 by means of a clevis-type hinge 21 which permits vertical swinging of the rotor blade, and through which the blade may be rotated about its axis if desired. The outer rotor ring 15 is shown as being axially confined within the guide track 16; and the pivotal mounting between the outer end of the blade and the rotor ring will be described subsequently. Additionally, the structure will be described which permits effective elongation of the rotor blade during coning.

With particular reference to FIGS. 4 and 5, the details of the turbine drive structure and the outer ring 15 and the guide track 16 will be described. As seen particularly in FIG. 4, the assembly of the rotor ring and guide track is generally oval in cross section to present a relatively smooth over-all contour to minimize wind resistance during horizontal flight. The guide track 16 is generally U-shaped in cross section defining a radially inward facing rectangular channel for accommodating and guiding a portion of the rotor ring 15 as will be described. For rigidity of structure, this guide track preferably includes an annular tubular member 23, which may be fabricated of aluminum, to which are secured other structural members fabricated of lightweight plastic materials for example. The plastic structural members provide upper and lower lips 24 and 25 respectively which define the upper and lower walls of the track channel. The tubular member 23 serves as an air supply chamber for the turbine drive, and is preferably divided by transverse partitions 22 into a plurality of circumferentially spaced air supply stations as will be described.

The rotor ring 15 is also preferably includes a continuous annular tubular member 27 fabricated of aluminum for example, this continuous annular tubular member being provided both for structural rigidity and to define a continuous annular chamber. Secured to the tubular member is a radially outward extending rib 28, which is generally rectangular in cross section to be received within the guide track channel, and upper and lower fairings 29 are secured to the tubular member 27 to define the above mentioned smooth oval section of the assembly.

The manner in which the rotor ring 15 is secured to the outer ends of the rotor blades 14 is particularly illustrated in FIG. 4, which shows a spar 31 which defines a longitudinal extension of the rotor blade. This spar extends, in sliding relation, through a bore provided in the spherical bearing member 32 of a spherical bearing which is rotationally confined in the spherical journal portion 33 rigidly mounted in the inner wall of the tubular member 27. This arrangement provides for the above mentioned pivotal movement between the outer ends of the rotor blades and the rotor ring 15; and also permits relative axial movement between the ends of the rotor blades and the rotor ring during the above mentioned coning of the rotor assembly.

The drive of the rotor assembly 12 is effected by a plurality of circumferentially spaced reaction turbine nozzles 37 provided in the rib 28 of the rotor ring. As best seen in FIGS. 4 and 5, the nozzles are compound curved nozzle passages, defined in the rib structure, having inlet openings in the circumferential outer wall 34 and defining a generally radially extending inlet portion, a generally downwardly extending intermediate portion, and a generally tangentially extending discharge portion. The discharge portion terminates in discharge openings provided in bosses 38 extending downwardly from the lower rib wall 36. As viewed in side elevation in FIG. 5, the bosses 38 define a sawtoothed contour projecting from the lower wall 36 to provide the generally tangential discharges from the nozzles 37.

Referring now in detail to the structure of the guide track, the channel is rectangular in section defined by a base wall 41, an upper wall 42, and a lower wall 43. As illustrated in the drawings, the upper and lower walls are parallel confronting walls, being spaced apart a distance slightly greater than the distance between the opposite facing upper and lower walls 35 and 36 of the rotor rib 28. The base wall 41 is a cylindrical wall confronting the cylindrical wall 34 of the rib; and the clearance between these confronting walls is sufficient to allow for some radial growth of the rotor ring 15 under the influence of centrifugal force.

The turbine nozzles 37 are supplied with low pressure air through supply ports 44 opening from supply chambers 45 defined, in the preferred arrangement as illustrated in the drawings, within the tubular member 23. As best seen in FIGS. 1 and 2, the guide track 16 is provided with five supply stations 46 equally spaced circumferentially about the guide track at the points of attachment of the struts 17 each station including a supply chamber 45. Each supply station is supplied with low pressure air from a pressurized gas source within the fuselage 10 through conduits provided within the struts 17. The strut journal 19, then, may define a supply manifold for the several struts 17. A preferred source of low pressure air may consist of a pair of low pressure, high volume air compressors driven by gas turbines. The two turbine-compressor units may be independent, for safety reasons, with each unit having a sufficient capacity to provide for safe descent of the aircraft in the event of failure of the other unit. While the specification refers to air as the motive fluid, it will be understood that other pressure fluids may be used with the apparatus according to the invention.

The manner in which the strut-conduits are pivotally joined to the guide track 16 is best shown in FIG. 4. In the area of the supply stations 46, the tubular member 23 is provided with an enlarged housing 47 which is contoured to be received within an enclosing housing 48 formed at the outer ends of the strut 17, the housings 47 and 48 defining a sealed hinge joint between the strut and the tubular member 23.

Each of the supply stations includes a supply chamber 45, defined within the tubular member 23 by the transverse partitions 22. These supply chambers are circumferentially elongated, but together may encompass a total only about ten percent of the total circumference of the outer track, for example. The supply ports 44 are defined by elongated slots which extend substantially the length of the supply chambers; the supply ports being of sufficient length for example, to communicate simultaneously with 15 rotor nozzles 37. In the area of the supply stations, the lower lip 25 is provided with discharge slots 51 corresponding in length to the length of the supply ports. These discharge slots are defined in the base wall of upward facing groove 52 provided in the wall 43 of the lower lip; the groove 52 being provided to accommodate the rotor nozzle bosses 38. In order to provide for structure rigidity of the lip 25, the slots 51 may be bridged by support ribs 53 which may be contoured to provide minimum restriction to flow from the turbine nozzles 37.

The separation between the guide track 16 and the rotor ring 15 is maintained by air bearings which will now be described with particular reference to FIGS. 4 and 6. The upper lip 24 is provided with a shallow recess 56 which is circumferentially elongated and preferably of such length as to span the length of a supply station 46. A plate-like air bearing pad 57, which may be fabricated of plastic for example, is dimensioned to be received in this recess and to float within the recess at an attitude generally parallel to the inner wall 42 of the lip and the upper wall 35 of the rotor rib 28. The bearing pad 57 is preferably sealed about its periphery to the lip 24 by flexible means which permit the pad to float within the recess 56, with the recess thereby defining a closed chamber behind the bearing pad. Similarly, the lower lip 25 is provided with two elongated shallow recesses 58 and 60, accommodating elongated bearing pads 59 and 61 respectively, mounted within the recesses to define closed chambers behind the bearing pads.

To define the circumferential ends on the supply stations, bearing pads 62 are sealingly secured to the base wall 41 of the guide track channel, adjacent to the ends of the supply ports 44, in a manner to be urged toward the outer wall 34 of the rotor rib. A portion of the air flowing from the ports 44 to the nozzles 37 will leak past the bearing pads 62 and maintain a pressure between the pads 62 and the rib wall 34. These air bearings generally maintain radial separation between the outer track 16 and rotor ring 15 and also provide seals at the ends of the supply stations to minimize air losses.

As best seen in FIG. 6, which is a transverse section adjacent to one end of a supply station, pressurized air for the chambers 56, 58 and 60 is supplied through respective restricted flow passages 63, 64 and 65. These passages may provide for a pressure reduction of the air flowing to the bearing chamber, when the air pressure required at the air bearings is less than that provided at the supply station 46. The air pressure within the recesses then urges the bearing pads toward the confronting rib surfaces. Air is supplied to the bearing faces of the bearing pads through suitable means, such as apertures provided in the bearing pads or through the pads which may have a predetermined porosity, to maintain a sufficient pressure between the several bearing pads and the respective rib faces to support the required loads.

A system for supplying pressurized air to the above described air bearing pals 57, 59 and 61, in the event of loss of the onboard air supply, is best shown in FIG. 6. This system includes a circumferential passage 66 in the rotor rib 28 which preferably defines a continuous annular chamber. This chamber 66 communicates with the rib walls in the areas of the bearing pads 57, 59 and 61 through respective passages 67, 68 and 69. A plurality of such passages are provided, being circumferentially spaced in the rib 28, so that the bearing spaces adjacent to the pads 57, 59 and 61 are communicated substantially continuously with the chamber 66; and this will tend to maintain the pressure within the bearings and within the annular chamber 66 about the same.

The annular chamber 66 communicates with the annular chamber 71, defined by the tubular member 27, through a pluarlity of circumferentially spaced passages 72. Checkvalves 73, associated with the passages 72, permit flow of air from the chamber 71 into the chamber 66, but prevents the reverse flow of air.

A predetermined pressure is maintained in the chamber 71 during rotation of the rotor by ports 74 and associated air scoops 75 mounted on the inner wall of the rotor ring 15. At the designed operating speed of the rotor, air will be directed into the chamber 71 to maintain a pressure which is equal to or slightly less than the desired pressure maintained at the air bearing pads 57, 59 and 61. The checkvalves 73 will prevent loss of supply air from the onboard power source which pressurizes the chamber 66; however, in the event of loss of the onboard power supply, air will flow from the chamber 71 through the passages 72 and checkvalves 73, then through chamber 66 and the associated passages 67, 68 and 69 to maintain an effective bearing pressure in the bearing spaces to permit descent of the aircraft by autorotation, for example.

By way of example, a practical aircraft as above described for accommodating up to five passengers may have the following criteria. The outside fuselage diameter may be about ten feet while the rotor blade tip diameter may be about 32 ft. An aircraft of this size may have a gross weight of 4,000 lbs. and an empty weight of about 2,000 lbs. The aircraft may be powered by two or more air compressors producing about 10,000 cubic feet per minute of air at a discharge pressure of 15 to 35 p.s.i.a.; and these compressors may be driven by suitable engines. The rotor outer ring may be provided with about 1,000 turbine nozzles equally spaced about the circumference and each having an exit area of about 0.2 square inch. The outer track could include about five air supply stations having a cumulative length to supply air to about ten percent of the nozzles, so that only ten percent of the nozzles are effective to drive the aircraft in any given instant. The supply station pressure of about 27.7 p.s.i.a. (13 p.s.i.g.) will allow the converging reaction jet nozzles to discharge the air at sonic or near sonic velocity for maximum power. The converging nozzles will provides a smooth thrusting force at lower pressures where less rotor power is required. With the rotor revolving at about 35 r.p.m., the rotor tip velocity is about 600 ft. per second. It is estimated that such an aircraft would have a vertical rate of climb in excess of 500 ft. per minute, a horizontal speed of 80 to 100 miles per hour and a range of about 200 to 300 miles.

Control of the aircraft is provided by varying the turbine operating pressure at the air supply stations, and also by varying the pitch of the rotor blades either collectively or cyclically by any suitable means, such means being known in the art of vertical lift aircraft.

A particular advantage of the above described aircraft and drive system is that a minimum reaction torque is imported to the aircraft fuselage and guide track tending to counter-rotate the fuselage, so that controls for maintaining directional stability of the aircraft may be simplified. This is accomplished by directing the air radially from the air supply stations into the reaction nozzles in the rotor ring, and discharging the high velocity air from the nozzles generally tangentially with minimum interference from the guide track structure. The reaction turbine system provides a versatile drive system for accommodating varying power requirements; and the drive system is simple and efficient for an aircraft of this type.

A feature of the rotor design is that the rotor ring 15 is substantially symmetrical about a horizontal bisecting plane so that the ring is structurally balanced to minimize stresses due to twisting of the ring structure during rotation.

Although the invention has been described with reference to a particular preferred embodiment, many changes and modifications will become apparent to those skilled in the art in view of the foregoing description which is intended to be illustrative and not limiting of the invention defined in the claims. For example, while the aircraft has been described with particular reference to compressed or presssurized air as the motive fluid for the turbine drive, it will be understood that other suitable pressurized gases may be employed.

What is claimed is:

1. In a rotary wing aircraft having a rotor which includes radially extending rotor blades and an annular ring connecting the outer ends of the blades, and having a fuselage which provides an annular guide track for the rotor ring; a turbine drive comprising:

means associated with said guide track defining one or more supply chambers for connection with a source of pressurized gas, and defining gas supply ports opening from said supply chambers; means in said rotor ring defining a plurality of circumferentially spaced converging nozzle passages; the inlet ends of said nozzle means being disposed for communication with said gas supply ports; and the discharge ends of said nozzle means being disposed to discharge gas in a direction generally tangential to said rotor ring.

2. A rotary wing aircraft as set forth in claim 1 wherein said converging nozzle means define reaction jets for increasing the velocity of gas at the discharge ends thereof.

3. A rotary wing aircraft as set forth in claim 1 wherein said converging nozzle means are disposed to direct the discharged gas in a direction in which the major component of reaction force is tangential to the rotor ring.

4. A rotary wing aircraft as set forth in claim 3 wherein said converging nozzle means are disposed to direct the discharged gas in a direction in which a minor component of reaction force is downward relative to the plane of the rotor ring.

5. A rotary wing aircraft as set forth in claim 1 wherein said supply ports are disposed to direct the gas radially to the inlet ends of said nozzle means; and wherein the inlet end portions of said nozzle means are radially disposed to receive gas flowing from said supply ports.

6. A rotary wing aircraft as set forth in claim 5 wherein said guide track defines a radially inward opening annular channel having a generally rectangular cross section; said supply ports opening to the base wall of said channel;
said rotor ring defining a radially outward extending annular rib, generally rectangular in cross section, dimensioned to be received and guided in said channel; said nozzle means being disposed in said rib;
the discharge ends of said nozzle means opening to the lower wall of said rib; and the lower wall of said guide ring channel being provided with arcuate slots having a circumferential extent corresponding to the circumferential extent of said supply ports to permit the discharge of gas from said nozzle means.

7. A rotary wing aircraft as set forth in claim 6 wherein the confronting upper and lower walls of said rotor rib and said guide track channel define fluid bearing means for maintaining axial separation between said rotor ring and said guide track.

8. A rotary wing aircraft as set forth in claim 7 including passage means in said guide track communicating said supply chambers with said fluid bearing means for supplying pressurized gas to said bearing means.

9. A rotary wing aircraft as set forth in claim 8 wherein said bearing passage means are relatively elongated, small bore passages to provide for a pressure drop in the gas flowing from said supply chambers to said fluid bearing means.

10. A rotary wing aircraft as set forth in claim 7 means providing a supply of pressurized air to said fluid bearing means comprising: means in said rotor ring defining a closed annular chamber; a plurality of circumerentially spaced port means communicating said chamber with the interior of said ring; and air scoop means fixed to said rotor ring adjacent to respective ones of said ports for directing ambient air through said ports into said chamber when said rotor is rotating; said scoops and said ports serving to maintain a predetermined pressure within said chamber; and circumferentially spaced passage means communicating said chamber with said fluid bearing surfaces of said rotor rib whereby a gas pressure is maintained in said fluid bearings substantially equivalent to that maintained in said chamber.

11. A rotary wing aircraft as set forth in claim 10 including checkvalve means associated with each of said port means for preventing the flow of gas in a direction from said chamber to the atmosphere.

12. A rotary wing aircraft as set forth in claim 10 including means defining a second annular chamber in said rotor ring; said port means including first ports communicating said second annular chamber with the exterior of said ring, and second ports communicating said first named chamber and said second chamber;
and said air scoops directing air through said first ports to pressurize said second annular chamber.

13. A rotary wing aircraft as set forth in claim 12 including checkvalve means associated with each of said second ports for preventing the flow of pressurized gas in a direction from said first named chamber to said second chamber.

14. A rotary wing aircraft as set forth in claim 13 including passage means in said guide track for directing pressurized gas from said supply stations to said fluid bearing means; said first named annular chamber being pressurized by said pressurized gas flowing from said bearing means through said rotor ring passage means; and said checkvalve means preventing flow of said pressurized gas from said first named chamber to said second chamber.

15. A rotary wing aircraft as set forth in claim 12 including passage means in said guide track for directing pressurized gas from said supply stations to said fluid bearing means; said first named annular chamber pressurized by said pressurized gas flowing from said bearing means through said rotor ring passage means; and said second chamber being pressurized to substantially the same pressure as said first named chamber through said first ports and air scoops, whereby substantially no flow occurs between said chambers during normal operationg conditions.

16. A rotary wing aircraft as set forth in claim 1 wherein said guide track and said rotor ring include portions in radially spaced relation; and wherein said gas supply ports and the inlet ends of said converging nozzle means are disposed in respective radially confronting walls.

17. A rotary wing aircraft as set forth in claim 16 said rotor ring defining an outward facing cylindrical wall; the inlet ends of said nozzle means opening to said outward facing wall; and said nozzle means including a generally radially disposed inlet portion, a generally vertically disposed intermediate portion, and a generally tangentially disposed discharge portion.

18. A rotary wing aircraft as set forth in claim 16 said supply ports comprising circumferentially elongated slots for simultaneously supplying air to a plurality of said nozzle means.

19. A rotary wing aircraft as set forth in claim 1 wherein said guide track defines a plurality of circumferentially spaced supply chambers;
said guide track being nonrotatably supported on said fuselage by a plurality of radially disposed struts; each of said struts defining a gas supply conduit for communicating a respective gas supply chamber with a source of low pressure gas disposed in said fuselage.

References Cited
UNITED STATES PATENTS

| | | | |
|---|---|---|---|
| 3,437,290 | 4/1969 | Norman | 244—23c |
| 3,507,461 | 4/1970 | Rosta | 244—23c |
| 3,532,303 | 10/1970 | Farkas | 244—23c |

MILTON BUCHLER, Primary Examiner

S. W. WEINRIEB, Assistant Examiner

U.S. Cl. X.R.

244—23c